No. 768,723. PATENTED AUG. 30, 1904.
F. BEHRE & E. C. LAUYER, Jr.
MUD GUARD FOR AUTOMOBILES.
APPLICATION FILED OCT. 14, 1903.
NO MODEL.

WITNESSES:
Henry Krug
Russell M. Everett

INVENTORS
Ferdinand Behre,
Ernest C. Lauyer, Jr.,
BY
Charles H. Pell
ATTORNEY.

No. 768,723. Patented August 30, 1904.

UNITED STATES PATENT OFFICE.

FERDINAND BEHRE, OF MORRISTOWN, AND ERNEST C. LAUYER, JR., OF CHATHAM, NEW JERSEY.

MUD-GUARD FOR AUTOMOBILES.

SPECIFICATION forming part of Letters Patent No. 768,723, dated August 30, 1904.

Application filed October 14, 1903. Serial No. 176,950. (No model.)

*To all whom it may concern:*

Be it known that we, FERDINAND BEHRE, residing at Morristown, and ERNEST C. LAUYER, Jr., residing at Chatham, in the county of Morris and State of New Jersey, citizens of the United States, have invented and produced a new and original Improvement in Mud-Guards for Automobiles, &c.; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

The objects of this invention are to enable a vehicle-wheel, such as an automobile or other horseless carriage, to be so inclosed or guarded in an emergency as that the occupants of the vehicle will be protected against spattering mud thrown by said wheel, to enable the guards to be quickly and conveniently applied to the wheels when needed, to enable the same to be easily and quickly removed from the wheels when no longer needed and compactly folded and laid away in the vehicle, to provide a simple and inexpensive structure, and to secure other advantages and results, some of which will be hereinafter referred to in connection with the description of the working parts.

The invention consists in the improved mud-guard and in the arrangements and combinations of parts of the same, all substantially as will be hereinafter set forth, and finally embraced in the clauses of the claim.

Figure 2:
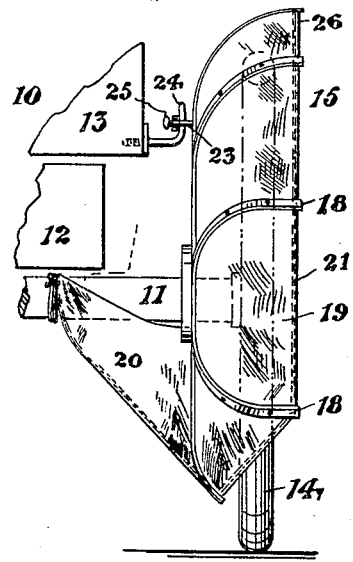
Figure 1:
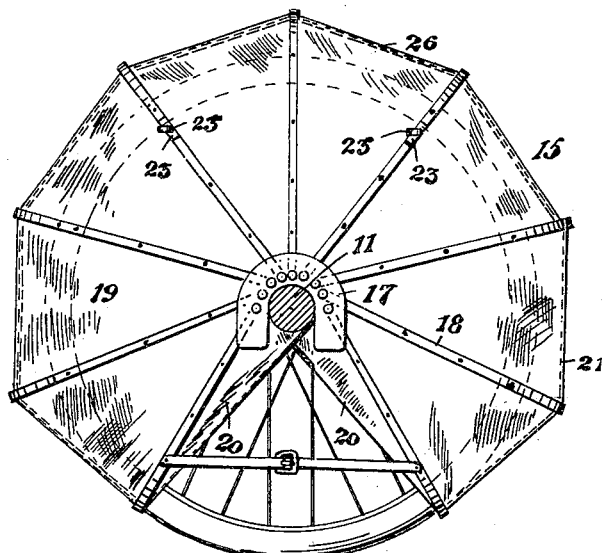
Figure 3:
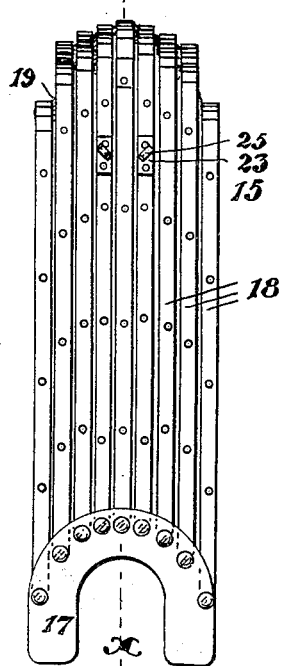
Figure 4:
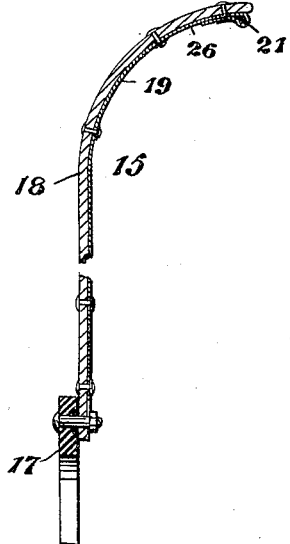

Referring to the accompanying drawings, in which like reference characters indicate corresponding parts in each of the several figures, Figure 1 is an inner side elevation of a guarded wheel. Fig. 2 is a front view of the same, showing a part of the vehicle. Fig. 3 is a detail elevation of our invention folded ready for packing away, and Fig. 4 is a section taken on line $x$.

In said drawings, 10 indicates a portion of a vehicle having an axle 11, motor 12, body 13, and wheel 14. Upon the said axle at the inner side of the wheel 14 is arranged my improved guard 15 for preventing the mud thrown from the wheel striking the body of the vehicle and its occupants. Said guard is provided at its center with a ∩-shaped center piece 17, adapted to lie over the axle 11, and at the front and rear of the same on this is pivoted a series of outwardly-curved ribs 18, over which is fastened a flexible covering 19, of flexible material, which may be and preferably is a textile fabric, to the opposite faces of which a varnish or paint has been applied— such, for example, as is usually employed in the manufacture of oil-cloths, carriage-cloths, &c. At the lower side of the guard the cloth is split open to permit the axle to enter its socket or seat in the ∩-shaped center piece, and at the split or opening (shown in Fig. 1) the cloth or covering 19 provides free flaps 20 20, which may be drawn back or inward beneath the motor 12 to protect the same.

At the periphery of the guard the ribs are connected by a cord 21, the opposite ends of which extend out from the free flaps to serve in tying the same to the axle. Straps 22 may also be employed at the split or opening to hold the guard in its open or expanded condition of Figs. 1 and 2.

To the upper part of the guard at the inner side and preferably on the ribs are arranged eyebolts or pieces 23, adapted to be hooked upon the body of the vehicle, as indicated in Fig. 2, the bolts 23 being secured to the hooks 24 by set-screws 25 or other suitable fasteners. Thus arranged in open position on the vehicle the guard forms a concavo-convex shield, the wheel of the vehicle lying in the outside cavity, so that any flying mud will be taken by the outwardly-extending peripheral flange 26, and thus be conducted, if the mud be soft, so as to readily flow to the split or opening, and thus be permitted to drop upon the ground.

By simply loosening the attaching means above described the guards may be readily removed when no longer needed, and they may then be folded together and closely nestled and packed together for future service.

Having thus described the invention, what we claim as new is—

1. The improved mud-guard, comprising a center piece and a series of ribs pivoted thereto and covered with a flexible fabric, the covering being split open at one side to permit the axle to be brought near to the center of the guard, and means for fastening said guard to the vehicle, substantially as set forth.

2. The improved mud-guard, comprising a center piece and a series of curved ribs pivoted thereto and covered with a flexible fabric, the covering being split or open at one side to permit the axle to be brought near to the center of the guard, and means for fastening said guard to the vehicle, substantially as set forth.

3. The improved mud-guard, comprising a ∩-shaped center piece and a series of ribs pivoted thereto and covered with a flexible fabric, the covering being split or open at one side to permit the axle to be brought near to the center of the guard, and means for fastening said guard to the vehicle, substantially as set forth.

4. The improved mud-guard, comprising a center piece and a series of ribs pivoted thereto and covered with a flexible fabric, the covering fabric being split or open at the lower side to permit the axle to be brought near to the center of the guard, and means for fastening said guard to the vehicle, substantially as set forth.

5. The improved mud-guard for vehicle-wheels, comprising a center piece, ribs pivoted to said center piece, an oil-cloth covering applied to said ribs, a peripheral cord free to be tied at its opposite ends and straps to hold the guard open, substantially as set forth.

In testimony that we claim the foregoing we have hereunto set our hands this 2d day of October, 1903.

FERDINAND BEHRE.
ERNEST C. LAUYER, Jr.

Witnesses:
 CHARLES H. PELL,
 C. B. PITNEY.